United States Patent
Merino-Gutierrez

(10) Patent No.: US 12,536,565 B1
(45) Date of Patent: Jan. 27, 2026

(54) DISPLAY BOOTH

(71) Applicant: Alfredo Jose Merino-Gutierrez, Newtonville, MA (US)

(72) Inventor: Alfredo Jose Merino-Gutierrez, Newtonville, MA (US)

(*) Notice: Subject to any disclaimer, the term of this patent is extended or adjusted under 35 U.S.C. 154(b) by 0 days.

(21) Appl. No.: 18/797,713

(22) Filed: Aug. 8, 2024

(51) Int. Cl.
*G06Q 30/0251* (2023.01)
*G06F 3/147* (2006.01)
*G09F 9/30* (2006.01)

(52) U.S. Cl.
CPC ......... *G06Q 30/0269* (2013.01); *G06F 3/147* (2013.01); *G09F 9/30* (2013.01)

(58) Field of Classification Search
CPC ........ G09F 9/30; G06F 3/147; G06Q 30/0269
See application file for complete search history.

(56) References Cited

U.S. PATENT DOCUMENTS

| | | | |
|---|---|---|---|
| 5,897,325 A | 4/1999 | Koby-Olson | |
| D831,148 S | 10/2018 | Ferrara | |
| D844,813 S | 4/2019 | Zhu | |
| 10,403,182 B2 | 9/2019 | Margrill | |
| 11,092,827 B2 | 8/2021 | Miyazaki et al. | |
| D957,317 S | 7/2022 | Dunn | |
| D968,650 S | 11/2022 | Liu et al. | |
| D970,042 S | 11/2022 | Sobiepanek | |
| D992,761 S | 7/2023 | Sobiepanek | |
| 11,829,970 B2 | 11/2023 | Shell et al. | |
| D1,009,298 S | 12/2023 | Bricknell et al. | |
| 2006/0292973 A1 | 12/2006 | Brooks | |
| 2014/0326795 A1 | 11/2014 | Leclerc | |
| 2018/0305943 A1 | 10/2018 | Pucci et al. | |
| 2018/0320394 A1 | 11/2018 | Reaves | |
| 2019/0119902 A1 | 4/2019 | Chen et al. | |
| 2019/0177993 A1 | 6/2019 | Shell et al. | |
| 2021/0116728 A1 | 4/2021 | Miyazaki et al. | |
| 2024/0298363 A1* | 9/2024 | Funatsu | H04W 76/10 |

* cited by examiner

*Primary Examiner* — Muhammad N Edun
(74) *Attorney, Agent, or Firm* — Goldstein Law Offices, P.C.

(57) ABSTRACT

A modular rectangular booth, having four vertical framing members, four panels extending between the framing members, the panels together defining an interior. Each of the panels is transparent, and has a display panel incorporated therewith for displaying images. A user can request access to the booth interior with a user mobile device. A locking mechanism selectively provides access to the booth interior. The booth has network connectivity for allowing a server to specify images to be displayed on the display panels and for providing internet connectivity to the user mobile device while within the interior.

12 Claims, 9 Drawing Sheets

DISPLAY BOOTH

BACKGROUND

1. Field of the Disclosure

The present disclosure pertains to modular privacy structures incorporated with display technology for advertising and utility purposes, specifically adapted for advertising panels, user accessibility, and ensuring security and connectivity. Such units are often employed in public and private spaces for providing information, advertisements, and user-specific services while maintaining structural integrity and user comfort.

2. Shortcomings of the Prior Art

Current modular structures used for public or private use, such as photo booths or information kiosks, predominantly utilize rigid frameworks, which complicate transportation and setup. This limitation often results in increased logistical costs and setup time, rendering them inflexible for deployments across varying locations. Additionally, existing structures suffer from inadequate integration of advanced display technologies, limiting their capacity to serve as versatile advertising mediums.

Traditional approaches to advertising displays within modular structures primarily rely on static or semi-static elements, such as printed posters or LED screens that lack the ability to offer tailored content dynamically. Furthermore, existing systems do not efficiently integrate features to maximize advertising impact, such as independent panel control or high-resolution displays under varied environmental conditions.

There are also deficiencies in user accessibility and security mechanisms present in today's modular structures. Limited access methods often fail to provide multiple secure entry points, such as app-based access, tap-to-pay functionality, or QR code scanning, thus restricting their use and flexibility. Connectivity solutions in current designs typically do not support seamless transitions between different network modes, leading to potential disruptions in service. There is also an absence of integrated power solutions, such as solar panels, which can enhance the sustainability and autonomy of these units.

What is needed is a modular structure that is easily transportable, integrating transparent display panels that function both as high-quality displays and windows. Such a structure would enable dynamic, independent control of each panel, fostering the capability to display customized advertisements and user-specific content. The incorporation of advanced access methods and the ability to switch between network modes seamlessly are necessary to enhance user convenience and security.

While these units may be suitable for the particular purpose employed, or for general use, they would not be as suitable for the purposes of the present disclosure as disclosed hereafter.

SUMMARY

In one aspect, a modular rectangular booth is disclosed, comprising a ceiling and four upstanding sidewalls extending orthogonally outwardly from the ceiling to form an enclosed volume. The sidewalls are constructed with display panels that are configured to display images and advertisements when active and to remain transparent when inactive.

One object of the technology is to provide a structure that can be easily transported and assembled due to its modular design. Another object is to enhance advertisement flexibility and visibility using transparent display panels, which allow for high-resolution displays and can switch between active and inactive states as needed.

In an embodiment, a processor is located at the top of the booth, connected to each display panel, enabling independent control of the displays. The processor may consist of a graphical processing unit capable of managing multiple displays concurrently and generating 3D video effects using positional mapping software.

In one aspect, the booth may comprise sensors capable of detecting an approaching individual. These sensors employ neural network algorithms to assess movement patterns and demographic attributes, thereby optimizing advertisement relevance. Further optional features include the ability for the interior panels to switch transparency for privacy, as well as exterior panels protected by polycarbonate replaceable layers to maintain high visibility under various environmental conditions.

Yet another object of the technology is to integrate connectivity and power solutions into the booth structure. This includes a wireless transceiver/antenna for providing an Internet signal within the booth, with connectivity capable of shifting between 4G and 5G networks. Solar panels treated with anti-reflective coatings and a power system with lithium-ion batteries ensure sustainable energy use.

In an embodiment, user amenities within the booth may include a foldable or stowable flip-down table with embedded cable management features, a floating shelf with adjustable height settings, and directional sound-canceling technology using active noise control. The booth also includes adjustable feet equipped with damping materials to improve stability and reduce vibrations.

In one aspect, security and access features may include a lock that prevents unauthorized access and helps maintain user privacy. The materials used in the construction of the booth are proposed to be recyclable, adhering to low carbon footprint manufacturing processes.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments.

However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION

Figure 1:
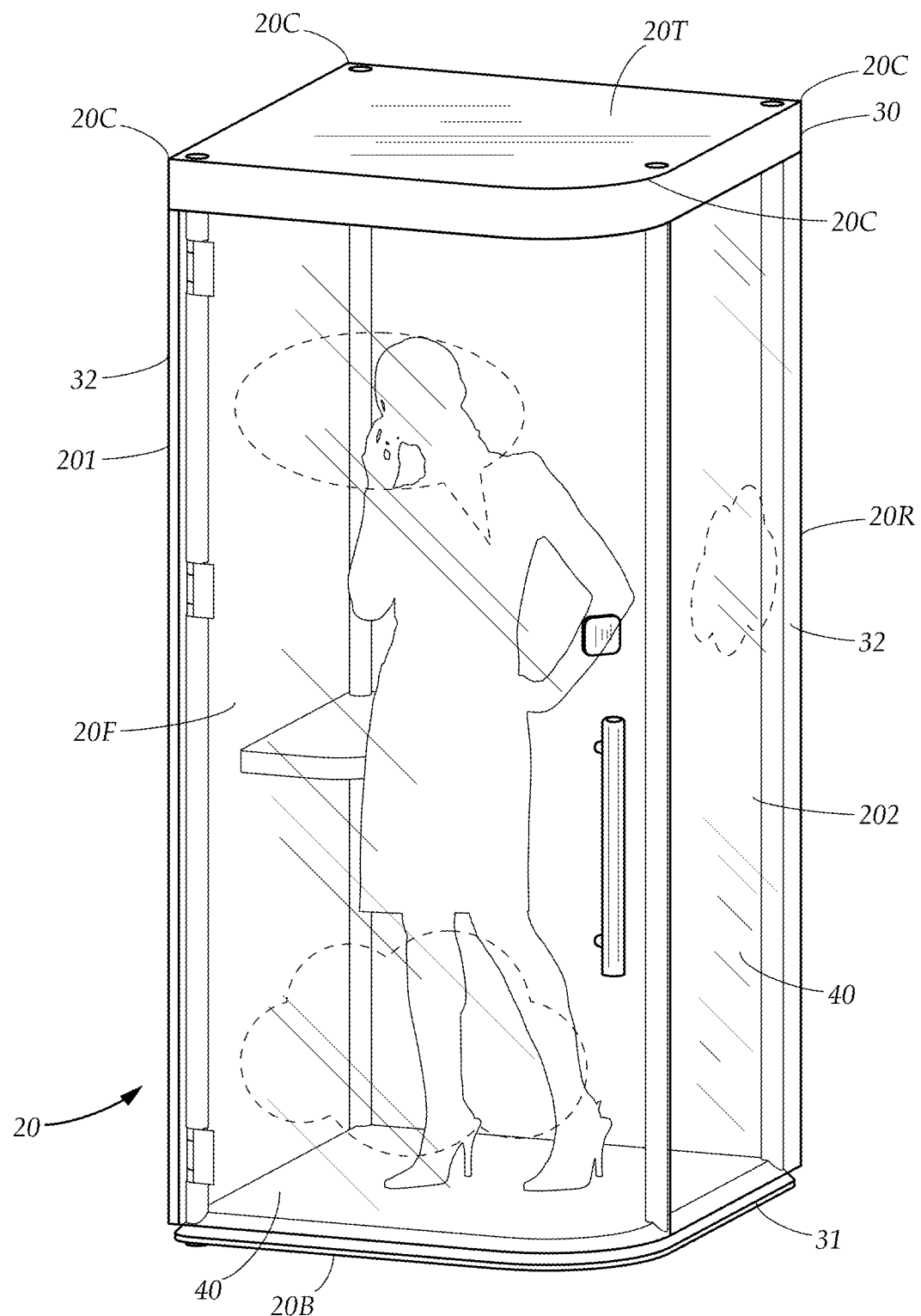
FIG. 1 shows a perspective view of an embodiment modular rectangular booth with transparent sidewalls in use.

Illustrated in FIG. 1 is a display booth 20 having a top 20T, a bottom 20B, a front 20F, a rear 20R, a first side 201, and a second side 202. The booth 20 has an upper housing 30 at the top 20T, the upper housing 30 having four corners 20C. Four frame members 32 extend vertically downward from the upper housing 30 at the corners 20C. The display booth has four panels 40 that extend between the frame members 32 and extend from the upper housing 30 to the bottom 20B of the booth. The panels 40 extend vertically at right angles to each other. The panels are substantially transparent fully from the upper housing 30 to the bottom 20B. The display booth may have a lower housing 31 at the bottom 20B of the booth, as seen in FIG. 1, or may be open at the bottom as seen in FIG. 3—wherein the frame members 32 rest upon a ground surface beneath the display booth 20. Together, the upper housing 30, and four panels 40 define an interior 20A (see FIG. 2) that is capable of accommodating an adult user while standing.

Figure 2:
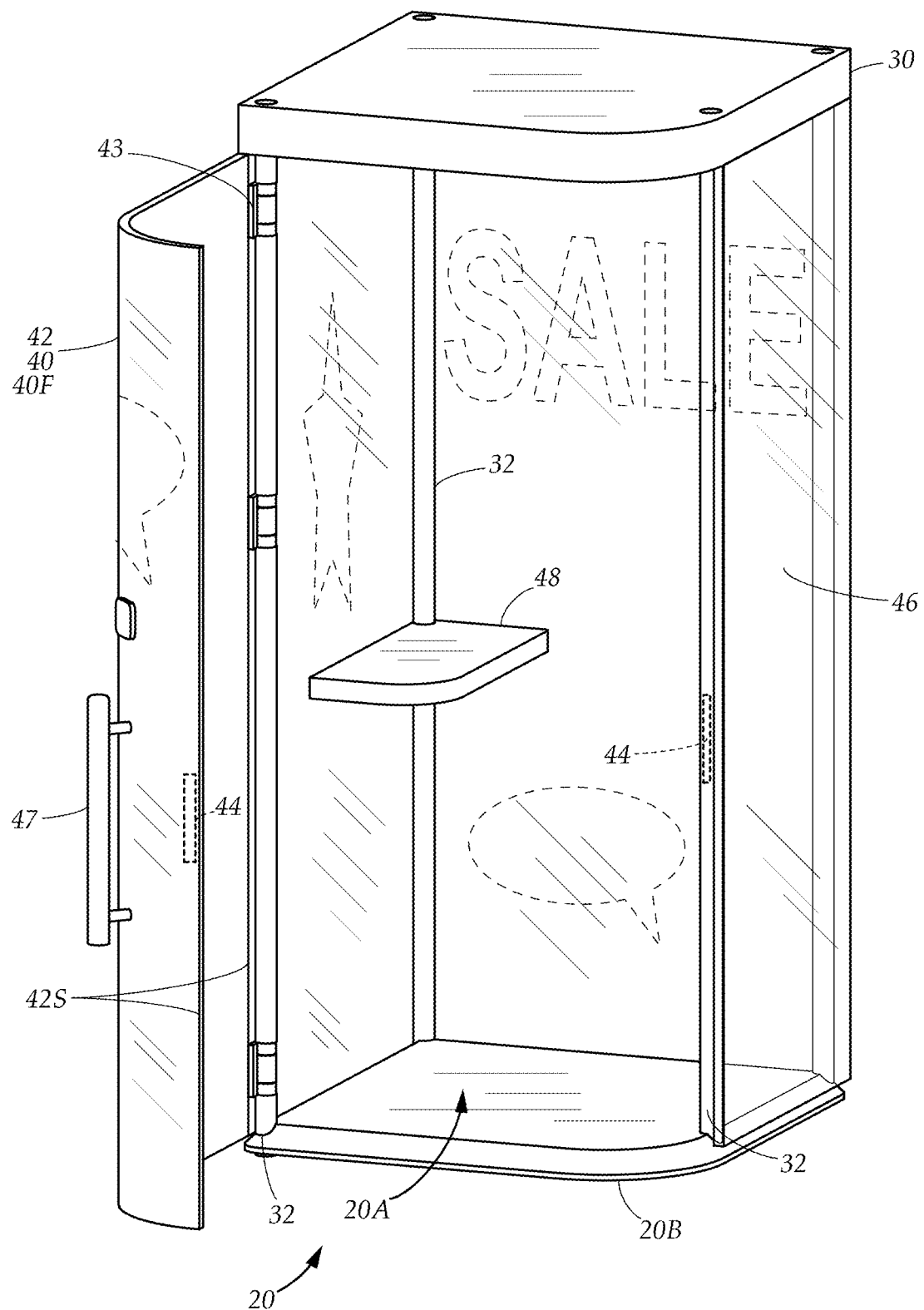
FIG. 2 is a perspective view of the modular rectangular booth with the door open.
Figure 3:
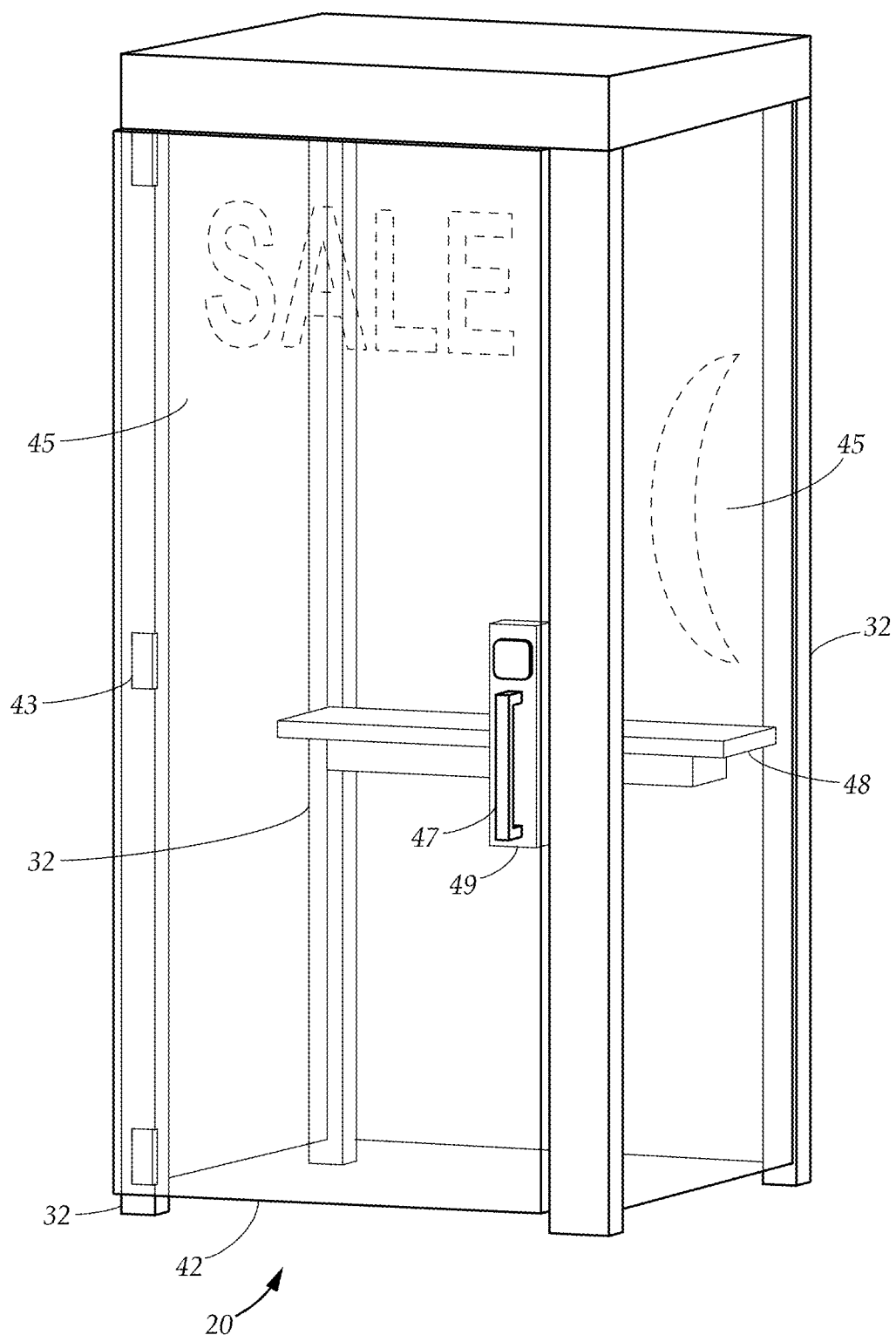
FIG. 3 is a front view of another embodiment of the modular rectangular booth.

Referring to FIG. 2, one of the panels 40 is a front panel 40F that also serves as a door 42 having a pair of lateral sides 42S, wherein it is attached to one of the frame members 32 at one of the lateral sides with a hinge 43, and is selectively detachable from another of the frame members 32 at the other of the lateral sides 42S. A door lock mechanism 44 at said other of the frame members 32 selectively maintains the door 42 in a closed position and selectively allows it to open, providing controlled access to the interior 20A. A handle 47 is attached to the door 42 for ease of operation. The panels 40 are made of glass or a similar transparent material, and are capable of displaying digital images fully between the upper housing 30, the bottom 20B, and between the frame members 32. In some embodiments and some panel 40 mounting configurations, the panels 40 may meet, edge-to-edge, and a digital image may be displayed continuously on all four panels 40. Accordingly, the booth 20 may be used to display advertisements or other images to people in the vicinity of the booth. The primary functionality required of the panels 40 is that they are transparent, and they are capable of displaying digital images that are viewable from outside the booth. To accomplish this, a variety of display technologies, both presently and prospectively available, can be used for the panels. 40.

Figure 11:
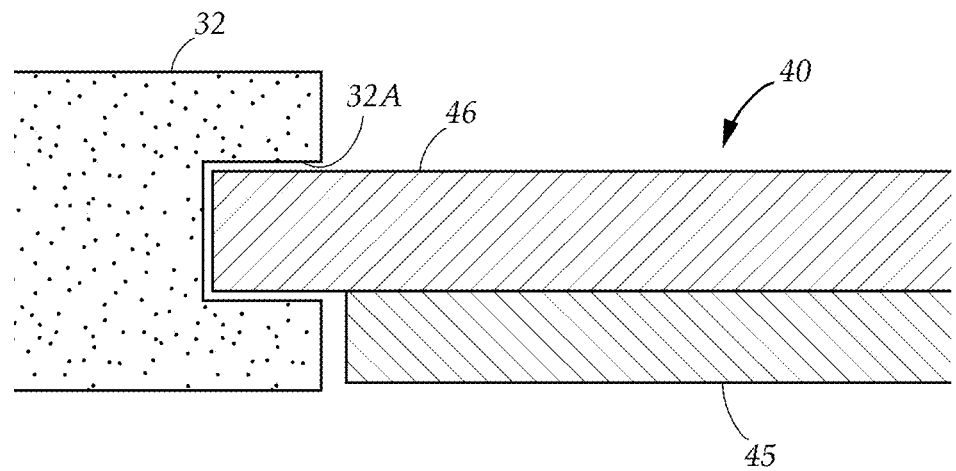
FIG. 11 is a top plan view, with parts broken away, showing an example of interconnection between a frame member and structural panels and display panels.

Referring to FIG. 11, the panels 40 may be constructed of a display panel 45 mounted to a structural glass panel 46 that is transparent. In this example, the structural glass panel 46 may mount within a channel 32A that extends vertically in the frame members 32. Accordingly, the structural glass panel 46 provides rigidity to the booth, and prevents structural stress from affecting the display panel 45, which may have an extremely thin and fragile substrate. The display panel 45 may extend substantially edge to edge with structural glass panel 46, but is protected by the structural glass panel 46. In this regard, the display panel 45 may be mounted inside the structural glass panel 46, outside the structural glass panel 46, or may even be encapsulated within the structural glass panel 46.

The display panels 45 may be implemented using a variety of technologies, including transparent OLED technology. Like traditional OLED screens, transparent OLEDs work on the principle of electroluminescence. OLED displays consist of thin films of organic molecules sandwiched between two conductive electrodes, typically made of glass or plastic. When an electric current is passed through these organic layers, they emit light. Unlike conventional OLED displays, where the substrate is opaque, transparent OLEDs use transparent substrates that are typically made of materials like glass or plastic that have been treated or engineered to be transparent, allowing light to pass through the display, making it see-through when not actively displaying images. In OLED transparent displays, transparent conductive materials such as Indium Tin Oxide (ITO) may be employed, which is transparent and conductive. These conductive layers are patterned to form the necessary circuitry for activating individual pixels while allowing light to pass through. Each pixel in a transparent OLED display consists of the same organic layers found in traditional OLEDs, but arranged in a way that allows light to pass through. Accordingly, the layers are engineered to be thinner and more transparent without compromising their ability to emit light efficiently.

FIG. 2 shows the display booth with the door 42 open, providing a view of the interior 20A. The booth 20 includes a platform shelf 48, situated at a mid-level inside the enclosure, which can be utilized for placing items. The platform shelf 48 may be attached to the one or more of the framing members 32, or may be attached to one of the structural glass panels 46. The platform shelf 48 may be configured to be foldable, so that it is conveniently available when desired, but may also be flipped upwardly out of the way. It is attached to the interior side wall of the booth, emphasizing their structural and functional aspects pertinent to the booth's operation.

FIG. 3 demonstrates a frontal view of an alternate embodiment of the display booth 20. This embodiment also features a transparent enclosure with a door 42 that includes a handle 47 and hinges 43. The door handle 47 in this version is attached to a handle assembly 49. The platform shelf 48 is positioned at a mid-level on the back wall, and in this example, extends frame 32 to frame 32. The transparent nature of the display panels 45 ensures visibility from multiple angles. Advertisements such as the word "SALE" and decorative elements are shown displayed on the display panels 45.

Figure 4:
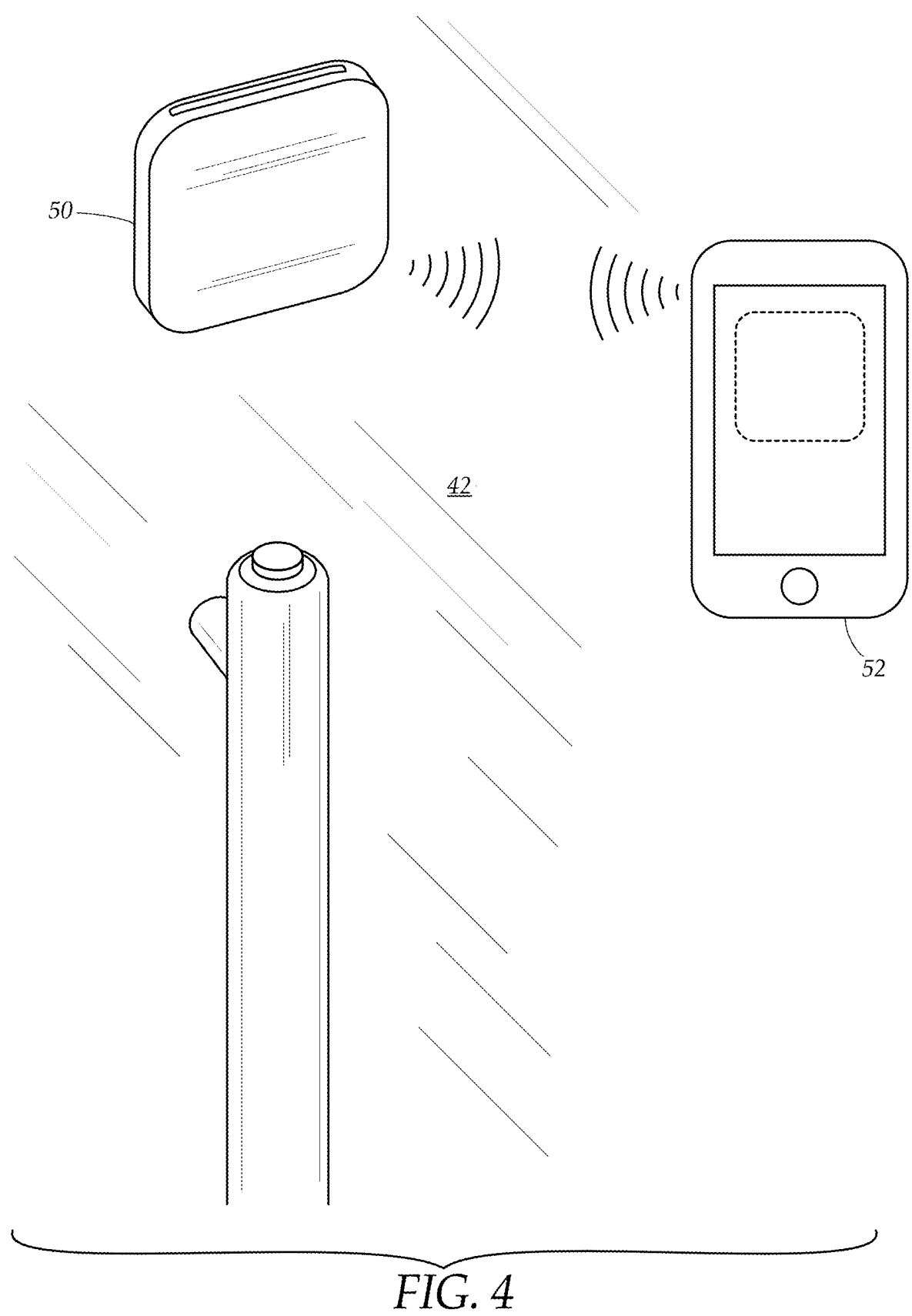
FIG. 4 is a perspective view showing wireless communication between a user mobile device and a panel on the booth.

Turning to FIG. 4, this figure depicts a close-up view of the interaction mechanism for the booth. A transaction interface, 50 such as a card reader, RFID interface, or contactless payment system, is shown attached externally, on the door 42. It may also be attached to the handle assembly 49 on the exterior near the handle (see FIG. 3). A mobile user device 52, exemplified by a mobile phone, is depicted interacting wirelessly with the transaction interface 50, facilitating near field radio frequency communications to provide secure access and transactions. The depicted waves indicate wireless communication capabilities, integral for advanced booth operations, including remote access or advertising updates. In general, access to the booth may require the user to use a software app on the mobile user device 52, may require the user to pay using the software app or by touching a credit card to the transaction interface 50, may require scanning a QR code printed or displayed on the door 42, or use any other suitable technology. The transaction interface 50 may also contain a camera or motion sensor, to detect the presence of others near the booth and to display content appropriate to them.

Figure 9:
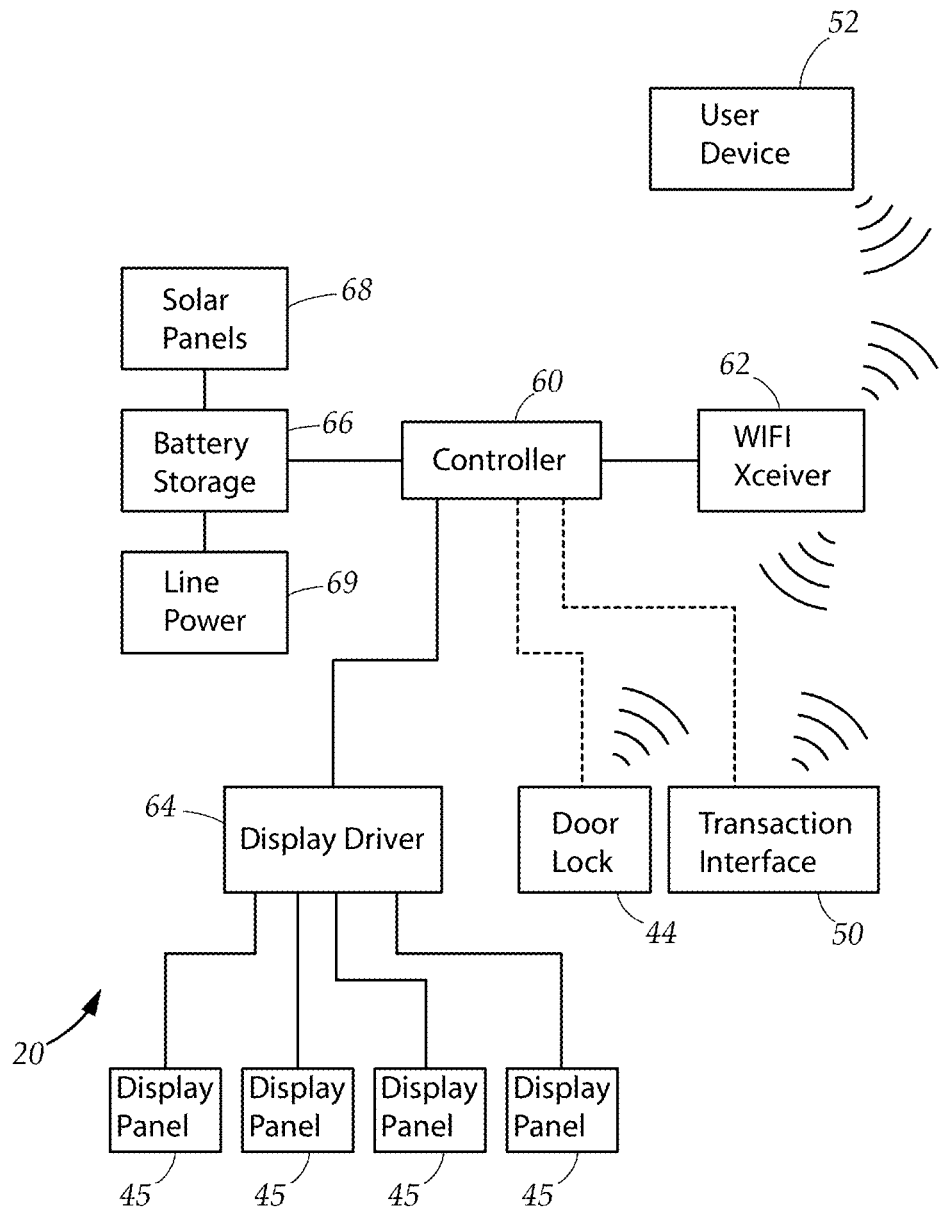
FIG. 9 is a functional block diagram, showing interconnection between various components in an exemplative embodiment of the booth.

Referring to FIG. 9, the booth 20 has a controller 60 for interconnecting functional components of the booth 20 and facilitating the specified operation and functionality of the booth 20 as described herein. A wifi transceiver 62, may provide a network connection to connect the controller to 60 to external devices, the user mobile device 52, the Internet as well as internal or local networks. The controller 60 can selectively display digital images on each of the display panels 45, through a display driver 64. Note that the displays may be interconnected in a variety of ways, including having a graphics processor associated with each of the display panels 45. The display driver 64 is capable of displaying independent images on each of the display panels 45, and can also appropriately divide a single image into individual images that can be displayed on the panels 45, such that a continuous image across the panels 45 is created. Note that "image" as used herein may refer to a static image, an animated image, a video image, and the like. The booth has internal battery storage 66, which may be charged by solar panels 68, and also by line power 69 when available. The controller 60 is also in communication with the door lock mechanism 44 and the transaction interface or RFID reader 50. Note that said connection may be wired, if structurally feasible, or wireless as indicated.

Figure 5:
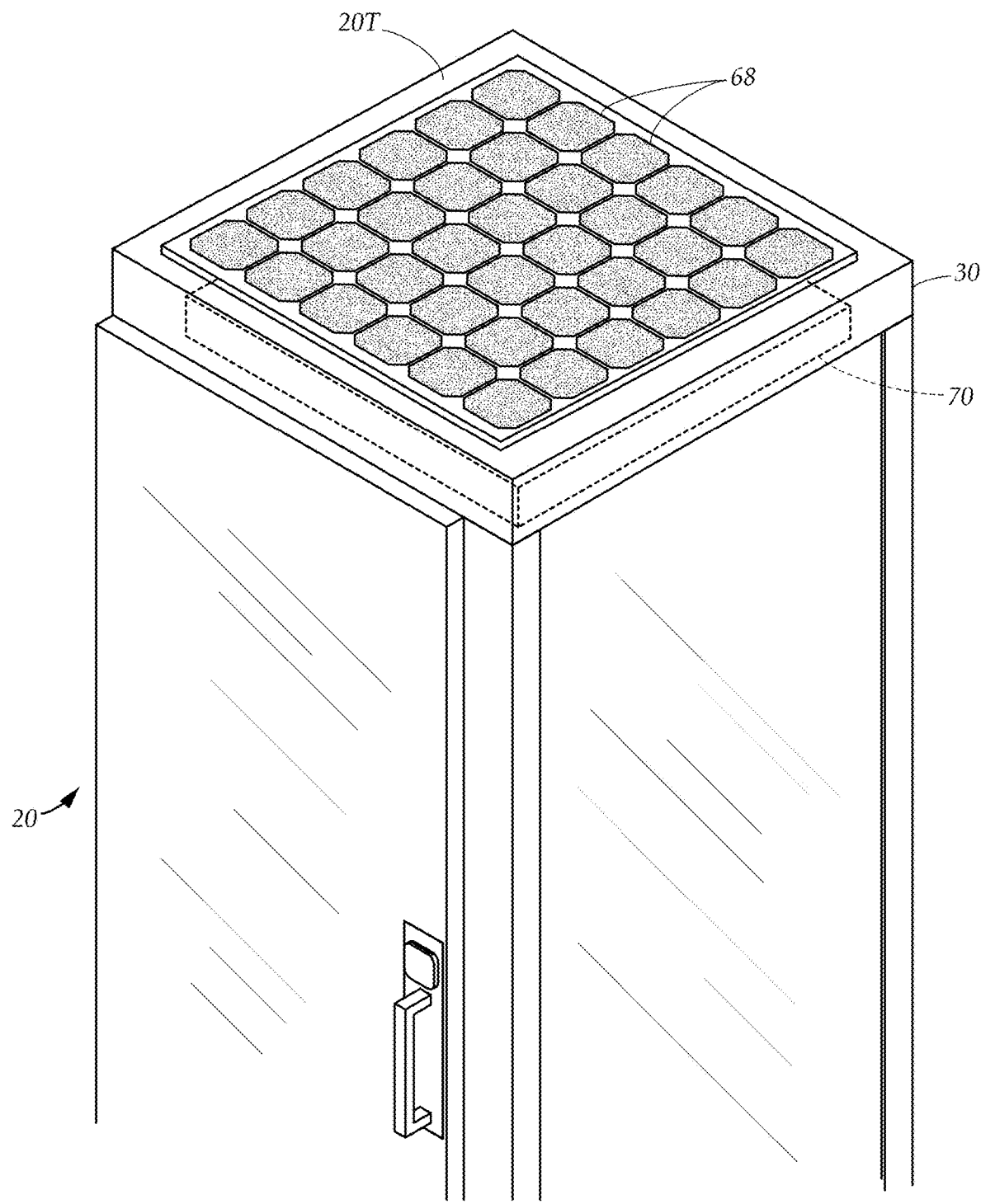
FIG. 5 is a perspective view of the top of the modular rectangular booth with integrated solar panels and associated control and power storage devices.

FIG. 5 details the upper housing of the display booth 20. Solar panels 68, namely photovoltaic devices, are located at the top 20T of the booth 20. The solar panels 68 provide significant flexibility in deployment of the booth 20, such that it may be used where line power is not available. In the upper housing, a control and power storage sub-housing 70 is provided, to contain information management and power components necessary to provide operation to the booth 20. In particular, the controller 60, battery storage 66, display driver 64, and wifi transceiver 62, shown in FIG. 9, may be located within the sub-housing 70. Ideally, electrical components are located at the top 20T of the housing to resist tampering and to allow the booth 20 to be deployed in locations that are subject to flooding.

Figure 6:
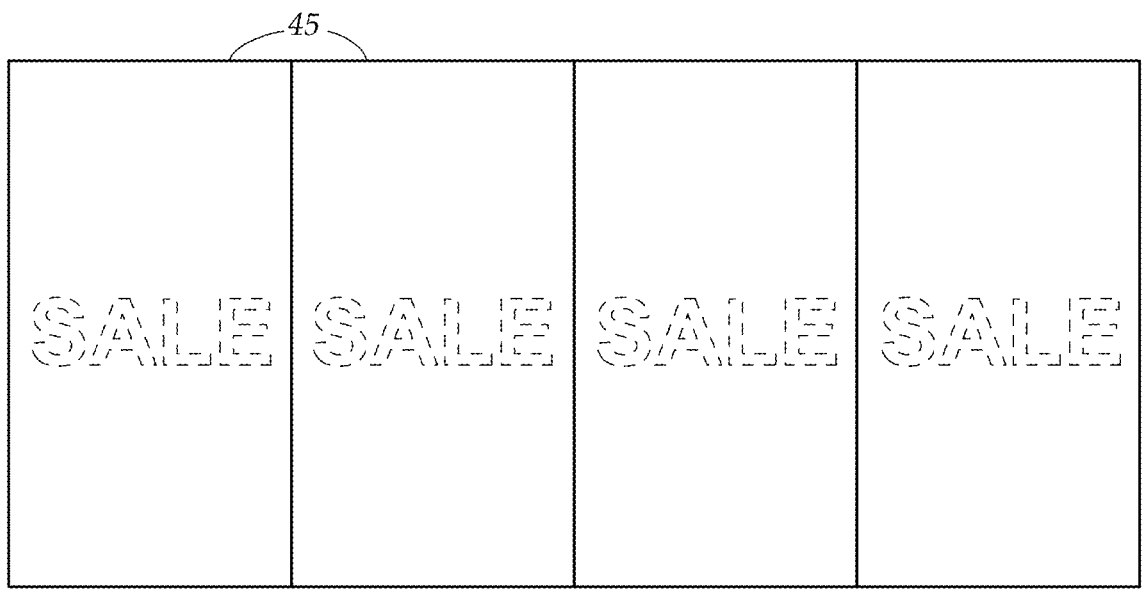
FIG. 6 is a front view of a plurality of display panels, arranged side by side, illustrating multiple display panels displaying content in unison.
Figure 7:
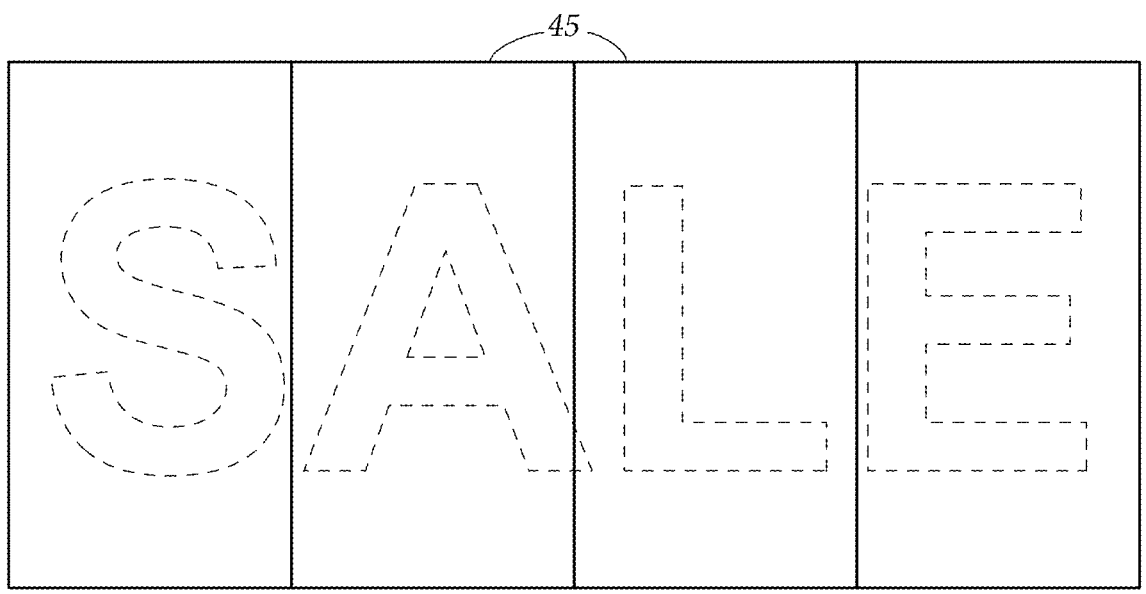
FIG. 7 is a front view, similar to FIG. 6, wherein the display panels each display a portion of a larger connected image.

FIGS. 6 and 7 depict an arrangement of four display panels 45. They may represent the display panels 45 of a single booth, or of multiple booths. FIG. 6 illustrates a sequence of smaller-scale advertisements that display the word "SALE" repeatedly across segmented panels. Each segment may be updated electronically to reflect real-time promotions. FIG. 7 may indicate a large-scale version of the same advertisement, wherein portions of a larger image are divided into individual images that are each displayed on one of the display panels 45, illustrating the capability of the panels 45 to cooperatively display interconnected and expansive marketing messages when appropriately synchronized.

Figure 8:
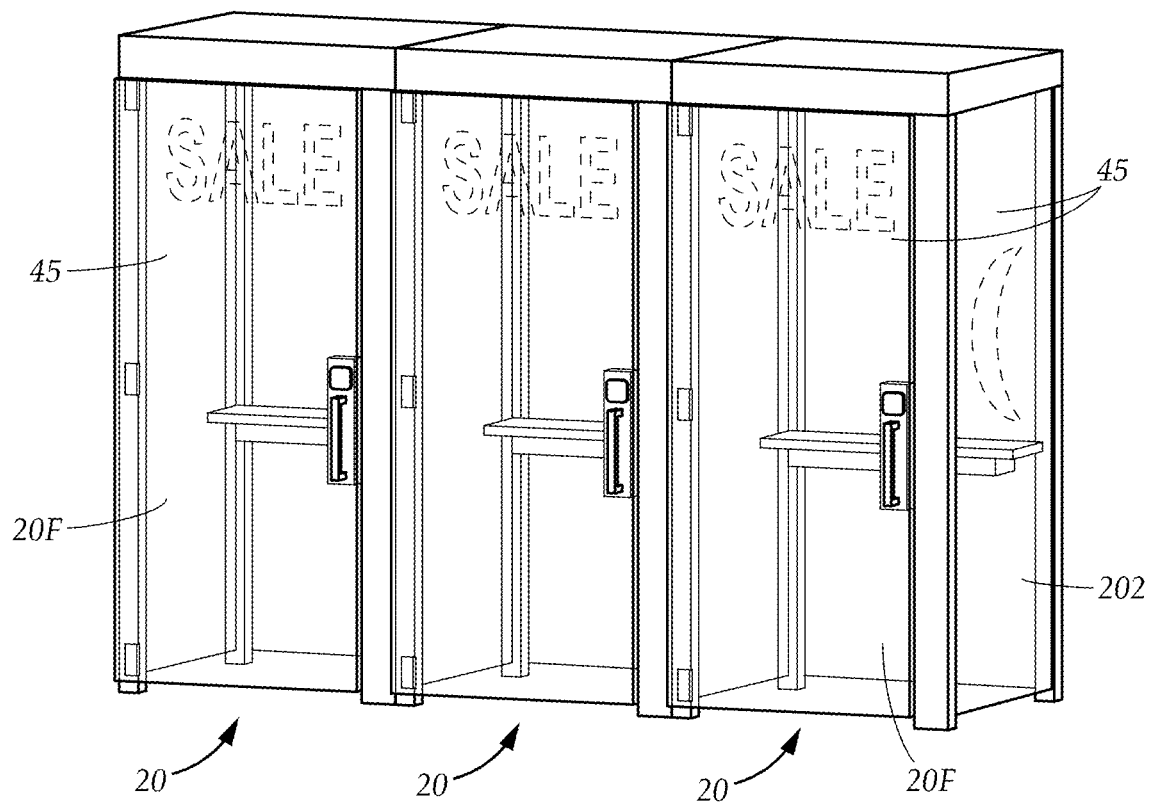
FIG. 8 is a perspective view illustrating multiple modular rectangular booths connected side-by-side.

FIG. 8 illustrates multiple display booths 20 arranged side by side. The booths are aligned in a manner conducive for larger display areas, and potentially synchronized for coordinated advertisements. Accordingly display panels 45 from different booths 20 that are substantially co-planar, in this case at the front 20F of each booth 20, can cooperatively display a continuous image made up of multiple individual images on the panels 45 of adjacent booths. A continuous display can also extend onto the non-planar panels. For example, on the righthand booth shown in FIG. 8, the image might continue from the panel on the front 20F to the panel on the second side 202. Each booth maintains the individual structural characteristics described previously, featuring transparent enclosures, access protocols, and the display capabilities as highlighted.

Figure 10:
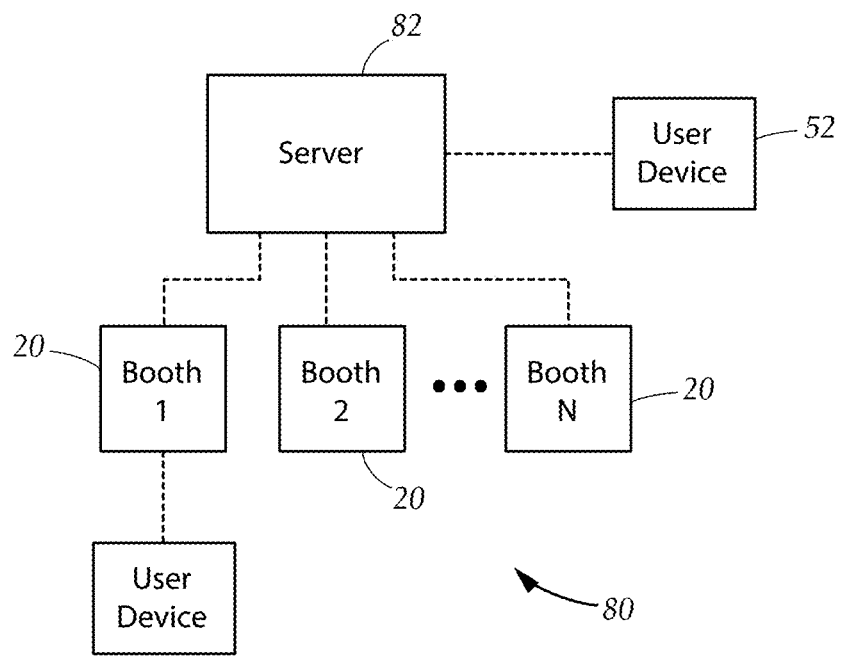
FIG. 10 is a functional block diagram, showing functional interconnection of a plurality of modular rectangular booths.

Referring to FIG. 10, a display booth network 80 is illustrated, wherein multiple booths 20 communicate with a server 82 via a network connection which may be a local area network (LAN) or wide area network (WAN). The server 82 may facilitate access requests to an individual booth with a mobile user device 52. Accordingly, when a user seeks to gain physical access to the booth, they can request access using the mobile user device 52. An access request may be initiated through an app, and may also be initiated by scanning a code or device at the booth 20. For example, a QR code may be printed or dynamically displayed on the booth 20. Alternatively, using near field technology, the mobile user device 52 may be detected by the transaction interface 50 (FIG. 9). The mobile user device 52 may be prompted to create an account, to enter payment information, to specify a desired booth, or schedule a desired booth prior to arrival. Payment may be accomplished through the app, or using the transaction interface 50 (FIG. 9) of one of the booths 20. When booth access is granted, either by the server 82 or locally by the booth 20, the door lock mechanism 44 (FIG. 2) is signaled to unlock, allowing the door 42 (FIG. 2) to open, and thereby allowing the user to step into the booth 20 and close the door for privacy. The app may gather marketing preference information from the user mobile device which may be used for customizing images when the user is in the vicinity of the booth or using the booth. The server 82 may provide display directives to each booth to specify images to be displayed on the display panels 45 (FIG. 9) of the booths. In particular, the server 82 may orchestrate which individual images are displayed on adjacent booths 20 so as to create a continuous or coordinated display thereon. Alternatively, the booth may operate in a master booth mode or slave booth mode, wherein the booth in the master booth can determine images to be displayed on other booths in slave mode, which would generally be adjacent or nearby. In addition, the display panels 45 (FIG. 8) can be configured to be variably transparent, such that their transmissive quality can be varied from nearly 100% transmissive to nearly 0% transmissive, using existing technology. Such a change in transparency can be triggered by the user, using the mobile device 52, and can also be initiated by the server 82 or controller 60 (FIG. 9).

Additional possible embodiments are described below, with simultaneous reference to all of the drawing figures as described hereinabove. In one such embodiment, the display booth 20 may include a climate control system integrated within the upper housing 30. This system may consist of a compact air conditioning unit, a heating element, a ventilation fan, or any combination thereof, to regulate the temperature and air quality within the interior 20A. The climate control system may be connected to the controller 60, allowing users to adjust climate settings via a user interface on the mobile user device 52 or through an interactive panel within the booth. The upper housing 30 may house the primary components of the system, while ventilation ducts may extend through or alongside the frame members 32 to distribute conditioned air evenly within the booth.

In another embodiment, the panels 40 of the display booth 20 may incorporate touch-sensitive technology, allowing users to interact directly with advertisements or other displayed content. The touch-sensitive layer may be integrated into the display panel 45 or added as a separate layer on top of the structural glass panel 46. This interactive feature may be managed by the controller 60 and synchronized with the displayed content, enabling functionalities such as product information retrieval, virtual shopping experiences, or interactive advertisements. The touch-sensitive panels may support multi-touch gestures to provide a user-friendly experience similar to that found on modern touchscreen devices.

In yet another embodiment, the display booth 20 may include an integrated audio system to enhance the multimedia experience provided by the digital display panels 45. The audio system may consist of loudspeakers mounted within the upper housing 30 or concealed within the frame members 32. The audio components may be connected to the controller 60, which can synchronize audio output with the visual content displayed on the panels 45, providing an immersive experience for passersby. The audio system may also offer the capability for users inside the booth to listen to audio content, such as music or recorded messages, with the output being adjustable via the mobile user device 52 or an internal touch panel.

In an additional embodiment, the lower housing 31 of the display booth 20 may feature modular compartments designed for storing items securely. These compartments may be accessible both from the outside and inside of the booth, providing users with a secure storage solution while conducting transactions or using the booth's facilities. The storage compartments may be controlled by the controller 60 and may be opened using the transaction interface 50 or the mobile user device 52, ensuring secure and convenient access.

In a further embodiment, the display booth 20 may be equipped with external lighting elements mounted on the top 20T and extending along the frame members 32. These lighting elements may include LED strips or spotlights configured to illuminate the booth and its surroundings. The external lighting may be controlled by the controller 60 and can be programmed to change colors, flash, or display patterns in coordination with the content shown on the digital panels 45. This feature may increase the visibility of the booth in low-light conditions and draw additional attention to the displayed advertisements or messages.

The figures collectively illustrate a versatile display booth system that integrates transparency, modularity, and advanced transaction interfaces to enable dynamic advertising and promotional capabilities within an enclosed space.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a modular booth. The disclosure is illustrated by example in the drawing figures, and throughout the written description. It should be understood that numerous variations are possible, while adhering to the inventive concept. Such variations are contemplated as being a part of the present disclosure.

The invention claimed is:
1. A modular rectangular booth comprising:
a front, a rear, a pair of sides, a top, a bottom;
a substantially rectangular upper housing at the top, the upper housing having four corners;
four frame members, each of the frame members extending vertically downwardly from one of the four corners of the upper housing to the bottom, and for resting upon a ground surface;
four panels, each panel fully transparent and extending between the frame members and vertically downwardly from the upper housing to the bottom, the panels include a front panel that is located at the front, each panel having a display panel that extends substantially edge to edge on the panel, the display panels each transparent and capable of displaying a digital image that is viewable from outside the booth;

a door, which provides access to the interior of the booth, the door includes the front panel, and is hingedly connected to the frame;

a locking mechanism connected to the door and frame, which selectively allows access to the interior by unlocking the door;

a controller, located in the upper housing and connected to the locking mechanism, the controller connected to each of the display panels for displaying images on the display panels; and a wifi transceiver, connected to the controller, for providing network connectivity to the booth so that images displayed on the display panels may be remotely controlled, providing network connectivity to a user mobile device when within the booth, and facilitating locking and unlocking the booth by the user mobile device.

2. The booth of claim 1, further comprising a transaction interface, attached to the booth near the door, adapted for facilitating near field communications with a device selected from the group consisting of a user mobile device and a credit card.

3. The booth of claim 2, wherein the controller can receive an access request from a user mobile device and grant access in response thereto by unlocking the locking mechanism.

4. The booth of claim 3, further comprising solar panels located on the upper housing at the top, and battery storage located within the upper housing, for allowing operation of the booth in remote locations.

5. The booth of claim 4, further comprising sensors capable of detecting an approaching individual to customize content displayed on the display panels to the individual.

6. The booth of claim 5, further comprising a foldable flip-down table attached to one of the interior sidewalls.

7. The booth of claim 6, wherein the panels are configured to vary transparency for privacy by varying transmissibility from nearly 100% to nearly 0%.

8. A modular rectangular booth, for use with a server and a plurality of user mobile devices, comprising:

a front, a rear, a pair of sides, a top, a bottom;

a substantially rectangular upper housing at the top, the upper housing having four corners;

four frame members, each of the frame members extending vertically downwardly from one of the four corners of the upper housing to the bottom, and for resting upon a ground surface;

four panels, each panel fully transparent and extending between the frame members and vertically downwardly from the upper housing to the bottom, the panels and frame members defining an interior, the panels include a front panel that is located at the front, each panel having a display panel that extends substantially edge to edge on the panel, the display panels each transparent and capable of displaying a digital image that is viewable from outside the booth, one of the panels is a door and is hingedly connected to one of the frame members;

a locking mechanism connected to the door and frame, which selectively prevents and allows access to the interior by locking and unlocking the door;

a wifi transceiver, for providing network connectivity to the booth, connecting the booth to the server, and providing network connectivity to a user mobile device when within the booth; and a controller, the controller connected to each of the display panels for displaying images on the display panels, connected to the wifi transceiver for interfacing with the external server to receive images to be displayed on the display panels, and for coordinating access to the booth with the server by operating the locking mechanism.

9. The modular rectangular booth as recited in claim 8, further comprising solar panels located on the top, and wherein the wifi transceiver and the controller are located in the upper housing.

10. The modular rectangular booth as recited in claim 9, wherein the server may gather marketing preferences from the user mobile device and may customize images displayed on the display panels when the user mobile device is in the vicinity of the booth or is within the interior of the booth.

11. The modular rectangular booth as recited in claim 10, further comprising a foldable flip-down table attached to one of the interior sidewalls.

12. The modular rectangular booth as recited in claim 11, further comprising a transaction interface, attached to the booth near the door, adapted for facilitating near field communications with a device selected from the group consisting of a user mobile device and a credit card.

* * * * *